United States Patent [19]

Hamuro et al.

[11] 3,893,996

[45] July 8, 1975

[54] HYDROXYALKYL AND MERCAPTOALKYL DERIVATIVES OF $\beta$-(1 → 3) GLUCANS

[75] Inventors: Junji Hamuro, Tokyo; Masao Akiyama, Kawasaki, both of Japan

[73] Assignee: Ajinomoto Co., Inc., Tokyo, Japan

[22] Filed: Aug. 2, 1973

[21] Appl. No.: 385,173

[30] Foreign Application Priority Data

Aug. 7, 1972   Japan................................ 47-78992

[52] U.S. Cl................................ 260/209 R; 424/180
[51] Int. Cl............................................. C07c 47/18
[58] Field of Search................................ 260/209 R

[56] References Cited
UNITED STATES PATENTS

| | | |
|---|---|---|
| 3,326,890 | 6/1967 | Engelskirchen et al......... 260/209 R |
| 3,349,077 | 10/1967 | Schweiger....................... 260/209 R |
| 3,396,082 | 8/1968 | Davis et al. ..................... 260/209 R |
| 3,542,759 | 11/1970 | Gelotte et al. .................. 260/209 R |
| 3,555,006 | 1/1971 | Storfer............................ 260/209 R |

*Primary Examiner*—Johnnie R. Brown
*Attorney, Agent, or Firm*—Hans Berman; Kurt Kelman

[57]     ABSTRACT

Sarcoma 180 in mice is strongly inhibited in its growth by injection of water-soluble hydroxy or mercapto alkyl glucans whose glucan moiety essentially consists of glucose units connected by $\beta$-(1 → 3) bonds, and which contains 0.08 to 1.0 hydroxy or mercapto alkyl moieties per glucose unit, the alkyl group having 2 to 4 carbon atoms.

7 Claims, No Drawings

HYDROXYALKYL AND MERCAPTOALKYL DERIVATIVES OF β-(1→3) GLUCANS

This invention relates to chemically modified β-(1 → 3) glucans having enhanced inhibiting effects on Sarcoma 180 in mice, and to the preparation of such modified glucans.

Some naturally occurring polysaccharides are known to have anti-tumor activity. They are generally separated from accompanying impurities with great difficulty and in low yields. It is a primary object of this invention to provide polysaccharide derivatives which are readily obtained in adequate purity at relatively low cost and have anti-tumor effects evidenced by their inhibiting action on Sarcoma 180 in mice. Another object is the provision of such polysaccharide derivatives which are water-soluble.

It has been found that the desired properties are possessed by hydroxyalkyl and mercaptoalkyl derivatives of glucans having a molecular weight of more than 10,000 characterized by glucosidic β-(1 → 3) bonds or linkages connecting the glucose units. These units may be linked exclusively by β-(1 → 3) bonds, or the (1 → 3) bonds may predominate over simultaneously present (1 → 2), (1 → 4), and (1 → 6) bonds to such an extent as to determine the essential characteristics of the glucan. The term "β-(1 → 3) glucan," as employed hereinafter, will be understood to embrace glucans having bonds other than β-(1 → 3) in minor proportions, not affecting the essential properties of the glucan.

The reactants which convert the glucans to derivatives of the invention are of the formula

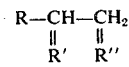

wherein R is hydrogen, methyl, or ethyl, R' is halogen having an atomic weight of at least 35, R'' is hydroxyl or mercapto, or R' and R'' jointly are oxygen or sulfur.

The hydroxyalkyl glucans of the invention thus are prepared by reacting β-(1 → 3) glucans with alkylene oxides or alkylene halohydrins, and the mercaptoalkyl glucans are similarly prepared by means of the corresponding alkylene sulfides or 1-mercapto-2-haloalkanes. The degree of substitution in the compounds of the invention is between 0.02 and 1.2, and preferably between 0.08 and 1.0 for best anti-tumor activity at acceptable cost, the term "degree of substitution" indicating the number of hydroxyalkyl or mercaptoalkyl moieties per glucose unit in the glucan moiety of the compound. The compounds having a degree of substitution of at least 0.08 are readily soluble in water, even when derived from glucans which are water-insoluble.

The tumor-inhibiting effects of the compounds are related to the length of the carbon chain in the substituent group, and the hydroxyalkyl or mercaptoalkyl moieties of the compounds should have two to four carbon atoms.

The β-(1 → 3) glucans, all of which are useful as starting materials in preparing the compounds of the invention, are readily available from a variety of natural sources. They include lentinan extracted from fruit bodies of Lentinus edodes Sing, β-pachyman extracted from Poria cocos Wolf, pachymaran obtained by chemical modification of β-pachyman, schizophyllan found in filtered culture broths of Schizophyllum commune, laminarin obtained from sea weeds, and glucans obtained by extraction of the fruit bodies of *Flammulina velutipes*, *Pholiota nameko*, *Pleurotus ostreatus*, *Tricholoma matsutake*, and other basidiomycetes, also glucans recovered from the mycelium and filtered broths of cultures of basidiomycetes, yeasts, and other microorganisms, and particularly screloglucans.

The preferred reactants for conversion of the β-(1 → 3) glucans to compounds of the invention are ethylene oxide, propylene oxide, 1, 2-butylene oxide, ethylene chlorohydrin, propylene chlorohydrin, ethylene sulfide, and propylene sulfide. Others, more costly, less effective, or producing less desirable compounds will readily be chosen without departing from the scope or spirit of the invention.

The glucans react readily in good yields with the alkylene oxides, alkylene halohydrins, and their sulfur-bearing analogs in dilute, alkaline, aqueous solutions. Such solutions may contain 0.1 to 10 percent by weight of an alkalinizing agent, most conveniently sodium hydroxide, and a sodium hydroxide concentration of 0.4 to 5 percent is preferred. Corresponding amounts of potassium hydroxide or of other strong bases are equally effective. The amount of alkaline reaction medium may vary between 10 and 1,000 ml per gram of glucan, and is chosen in accordance with the properties of the glucan, the desired degree of substitution, the amount of the reactants, and other process variables.

Typically, the glucan is dissolved in the alkaline medium, and the solution is protected by a blanket of nitrogen or other inert gas before the converting reactant is added in a preferred amount of more than 1 mole per glucose unit in the glucan. The reaction is sluggish in the absence of excess alkylene oxide or other converting reactant. While the glucan is preferably dissolved at a temperature of 30° to 50°C, the reaction may be carried out at lower temperatures, such as 0° to 40°C, to avoid hydrolysis of the β-(1 → 3) bonds in the alkaline medium, and the amount of alkalinizing agent is chosen to avoid hydrolysis.

The alkaline aqueous solutions of some glucans, such as β-pachyman and screloglucan, tend to be viscous, and relatively large amounts of aqueous medium must be employed to maintain the fluidity required for smooth reaction. Under these conditions, the converting reactant must be employed in particularly large excess since much of it is lost by side reactions. The relationship between the concentration of the ingredients in the reaction mixture and the amount of reactant required to achieve a desired degree of substitution is readily determined by trial and error and will be evident hereinafter from the description of specific process conditions.

The degree of substitution can be controlled adequately by varying the amount of converting reactant in the reaction medium. By way of example, the synthesis of hydroxyethyl-β-(1 → 3) glucan having a degree of substitution of 0.5 may require 4 to 10 moles ethylene oxide per anhydrous glucose unit in β-pachyman, depending on other variables, and 20 moles may be needed to achieve a degree of substitution of 0.8.

The reaction is preferably continued until the converting reactant is consumed, which may take a few hours or twenty hours, for example, and the reaction mixture may thereafter be neutralized with an acid, hydrochloric or acetic acid being both suitable and inexpensive, but other acids are also equally operative.

If the degree of substitution in the product is low, neutralization may cause an amorphous precipitate to form. The precipitate may be recovered by decanting or centrifuging, purified by being suspended in consecutive changes of aqueous methanol of increasing concentration, and ultimately in absolute methanol, and the purified product further washed in ether and/or acetone and dried in a vacuum. Other purification methods, conventional in themselves, also lead to recovery of a white, water-soluble powder.

At higher degrees of substitution, the compounds of the invention are soluble in the neutralized reaction medium and may be recovered therefrom by adding water-miscible organic solvents in which the hydroxyalkyl or mercaptoalkyl glucans are insoluble, such as methanol or acetone. A white powder is obtained directly, and may be further purified by solvent extraction.

The basic chemical structure of the compounds of the invention is that of the glucans from which they were prepared. They are not polyelectrolytes and are soluble in water. They inhibit the growth of Sarcoma 180 in mice whether or not the parent glucan had tumor-inhibiting effects. If a glucan having anti-tumor effects, such as pachymaran, is employed as the starting material, the activity against Sarcoma 180 is enhanced considerably. Additionally, the solubility in water is improved so as to facilitate application. The compounds of the invention are stable, and do not lose their tumor-inhibiting properties over extended storage periods.

The following Examples are further illustrative of the preparation of the hydroxyalkyl and mercaptoalkyl glucans of the invention, and of the inhibiting effects of the modified glucans on Sarcoma 180 in mice. All percentage values are by weight.

EXAMPLE 1

30 g β-Pachyman was dispersed in two liters 0.8% aqueous sodium hydroxide solution in a 3-liter flask by stirring at 40°C and 270 r.p.m. The air in the flask was replaced by nitrogen, and 12 ml (0.25 mole) liquid ethylene oxide was added. Stirring of the resulting mixture was continued for 24 hours when ethylene could no longer be detected, and the mixture had become gelatinous. It was adjusted to pH 7.0 with concentrated hydrochloric acid and centrifuged. The supernatant liquid was discarded, the precipitated, amorphous solids were suspended in 5 liters 70% aqueous methanol by stirring in a homogenizer, and the washing liquid was removed from the washed solids by centrifuging. The washing operation was repeated sequentially with 3 liters 80% methanol, 2 liters 90% methanol, and 2 liters absolute methanol. The solids were recovered from the last washing liquor by filtering, washed again in 2 liters acetone, filtered off, and dried in a vacuum at ambient temperature. A white powder was obtained in an amount of 24.8 grams and was found to have a degree of substitution of 0.08. This product will be referred to hereinafter as Compound I.

Compound II was obtained in an amount of 29.0 g in an otherwise identical manner by increasing the amount of ethylene oxide to 24 milliliters (0.5 mole). Its degree of substitution was 0.11.

EXAMPLE 2

60 g β-Pachyman dispersed in 2 liters 1.2% sodium hydroxide solution was reacted with 48 milliliters (1.0 mole) ethylene oxide under conditions otherwise as in Example 1. Compound III was obtained in an amount of 58.2 g and had a degree of substitution of 0.26.

When the amount of ethylene oxide was increased to 75 ml (1.5 mole), Compound IV was obtained in a yield of 59.4 g and had a degree of substitution of 0.43.

Reducing the amount of β-pachyman to 30 g and simultaneously increasing the amount of ethylene oxide to 96 ml (2.0 moles) resulted in the recovery of 32.0 g Compound V as a white powder having a degree of substitution of 0.52.

When the amount of ethylene oxide was further increased to 144 ml, and the 30 g β-pachyman was dispersed in 1.5 liters 1.6% sodium hydroxide solution, Compound VI was recovered in an amount of 36.0 g and had a degree of substitution of 0.78.

EXAMPLE 3

3 g β-Pachyman was dissolved in 200 ml aqueous 1% sodium hydroxide solution and reacted under a nitrogen blanket with 8.1 g (0.1 mole) ethylene chlorohydrin at 40°C for 4 hours with stirring. The reaction mixture was cooled to ambient temperature, and 600 ml methanol was added. The resulting precipitate was filtered off, washed and dried. Compound VII having a degree of substitution of 0.46 was obtained in an amount of 2.8 g.

Substitution of an equimolecular amount (9.5 g) propylene chlorohydrin for the ethylene chlorohydrin produced 3.1 g Compound IX having a degree of substitution of 0.38.

Reduction in the amount of propylene chlorohydrin to 4.8 g (50 millimole) resulted in a gelatinous reaction mixture which was worked up as in Example 1 to yield 2.7 g Compound X having a degree of substitution of 0.24.

3.4 g Compound XI was obtained by increasing the amount of propylene chlorohydrin to 19.0 g (0.2 mole) and purifying the reaction product as in Example 1. Compound XI is a white powder which was found to have a degree of substitution of 0.70.

EXAMPLE 4

3 g β-Pachyman dissolved in 200 ml 1% sodium hydroxide solution was reacted with 5.8 g (0.1 mole) propylene oxide with stirring at room temperature for 24 hours. The reaction mixture was worked up as in Example 1 to yield 3.1 g Compound VIII as a white powder having a degree of substitution of 0.41.

EXAMPLE 5

3 g β-Pachyman dissolved in 200 ml 1% sodium hydroxide solution was reacted with 14.4 g (0.2 mole) 1,2-butylene oxide with stirring at room temperature for 24 hours, and the reaction mixture was worked up by precipitation of the water soluble Compound XII so produced with methanol as in Example 3. The Compound was obtained in a yield of 3.1 g and had a degree of substitution of 0.36.

EXAMPLE 6

3 g β-Pachyman was dissolved in 200 ml 0.5% sodium hydroxide solution, and 12g (0.2 mole) ethylene sulfide was added. The mixture was stirred 2 hours at 40°C, and worked up generally as in Example 1, using repeated changes of acetone and ether as washing liquids. Compound XIII was recovered as a white powder weighing 4.1 g and having a degree of substitution of 0.38.

When the amount of ethylene sulfide was reduced to 6.0 g (0.1 mole), Compound XIV was obtained in an amount of 3.8 g and had a degree of substitution of 0.29.

EXAMPLE 7

Compounds I to XIV and the β-pachyman employed as a common starting material in Examples 1 to 6 were tested for their ability of inhibiting the growth of Sarcoma 180 in mice.

Two matched groups of ICR-JCL mice were injected subcutaneously with 0.05 ml Sarcoma 180 ascites in the right groin. 24 Hours after the injection and daily thereafter for a total of ten days, the mice in one group were given intraperitoneal injections of aqueous solutions or dispersions of the tested compound in amounts of 5 mg/kg body weight per injection. After 5 weeks, the mice of the tested group and of the untreated control group were killed, and the tumors, if any, were excised and weighed. The weight change in the treated mice during the 5-week period also was recorded.

The "inhibition ratio" characteristic of the tested compound was determined as the percent reduction in average tumor weight in the tested mice as compared to the mice in the control group, and the complete regression of the tumors was determined in a randomly selected number of tested mice.

Table 1 lists for each tested compound the degree of substitution, that is, the number of hydroxyalkyl or mercaptoalkyl groups per glucose unit of the modified pachyman, the change in body weight of the tested mice in grams, the inhibition ratio as defined above, and the number of complete regressions together with the number of tested animals investigated for regression. Relevant data for the starting material also are presented and show absence of tumor-inhibiting properties.

Generally, the inhibition ratio increases with the degree of substitution within the tested range, and it is higher for hydroxyethyl substituents than for those of greater chain length. The mercaptoalkyl compounds are slightly inferior to the corresponding hydroxyalkyl derivatives, and there is little difference, if any, between the hydroxyalkyl pachymans of comparable degree of substitution produced by means of the alkylene oxides and those produced by means of the alkylene chlorohydrins.

Table 1

| Comp'd | Degree Subst. | Body Weight Change,g | Inhib. Ratio,% | Compl. Regr. |
|---|---|---|---|---|
| I | 0.08 | +5.3 | 9.3 | 1/5 |
| II | 0.11 | +7.4 | 61.4 | 2/5 |
| III | 0.26 | +5.7 | 99.3 | 4/5 |
| IV | 0.43 | +7.6 | 100 | 5/5 |
| V | 0.52 | +7.8 | 100 | 5/5 |
| VI | 0.78 | +7.2 | 100 | 5/5 |
| VII | 0.46 | +7.1 | 92.0 | 4/5 |
| VII | 0.41 | +6.8 | 86.0 | 5/10 |
| IX | 0.38 | +6.7 | 91.1 | 5/10 |
| X | 0.24 | +7.1 | 78.0 | 6/10 |
| XI | 0.70 | +6.9 | 97.0 | 8/10 |
| XII | 0.36 | +6.4 | 86.0 | 4/10 |
| XIII | 0.38 | +6.5 | 73.5 | 4/10 |
| XIV | 0.29 | +6.7 | 80.6 | 4/10 |
| β-Pachyman | — | +5.5 | −8.1 | 0/5 |
| Control | | +6.3 | | |

EXAMPLE 8

Tests analogous to those described in Example 7 were also performed at other individual dosage rates. The results obtained with Compound IV are characteristic of the effect of dosage change, and are listed in Table 2.

Table 2

| Dosage mg/kg | Body Weight Change,g | Inhib. Ratio,% | Compl. Regr. |
|---|---|---|---|
| 0.1 | +8.5 | 19.2 | 0/9 |
| 0.5 | +10.5 | 59.6 | 0/9 |
| 1.0 | +9.9 | 88.1 | 3/10 |
| 25 | +8.0 | 99.7 | 9/10 |
| (Control) | +6.3 | | |

As little as 0.5 mg/kg of Compound IV per injection is thus shown to have a significant inhibiting effect on the growth of Sarcoma 180 in the tested mice.

The growth of the tumors was also checked by palpation of the live mice. At a dosage rate of 5 mg/kg/injection, Compound IV produced complete regression of the tumors, as determined by palpation, in 4 out of 5 mice within 2 weeks.

EXAMPLE 9

30 g Pachymaran, which has known anti-tumor effects, was reacted in 2 liters 1.2% sodium hydroxide solution with 96 ml (2.0 moles) ethylene oxide in the manner of Example 1 to produce 28.0 g of a white powder having a degree of substitution of 0.56.

The modified pachymaran was tested by the method described in Example 7 and was found to have an inhibition ratio of 99.3 percent which compares favorably with that of the pachymaran employed as a starting material.

When the amount of ethylene oxide was increased to 144 ml, the modified pachymaran obtained in an amount of 36.0 g and having a degree of substitution of 0.77 showed an inhibition ratio of 98.6 percent.

EXAMPLE 10

An extracellular polysaccharide was recovered from a liquid culture broth of Ganoderma applanatum (NRRL 3990). 3 g Polysaccharide was dissolved in 150 ml aqueous 1% sodium hydroxide solution, and 12.2 g (0.15 mole) ethylene chlorohydrin was added at 40°C. The mixture was stirred at that temperature for 4 hours, cooled, and worked up as in Example 1. A white powder, soluble in water, was obtained in an amount of 3.8 g.

The initial polysaccharide, when injected in mice in 10 daily doses of 25 mg/kg, showed an inhibition ratio of 35% and complete regression of Sarcoma 180 in 3 of 10 tested mice. The hydroxyethyl derivative, when used in daily dosages of 5 mg/kg inhibited tumor growth in a ratio of 94%, and produced complete regression in 8 out of 10 mice, the tests being performed generally as described in Example 7.

EXAMPLE 11

2 g Extracellular polysaccharide recovered from a culture broth of Favolus arcularius (FERM P-1543) was dissolved in 150 ml 1% sodium hydroxide solution and reacted at 40°C for 6 hours with 8.1 (0.1 mole) ethylene chlorohydrin. The hydroxyalkyl derivative recovered in the manner of Example 1 was a white, water-soluble powder weighing 2.6 g.

When tested in the manner described in Example 7, it produced complete regression in 6 out of 8 tested mice and showed an inhibition ratio of 96 percent. Under otherwise identical conditions, the polysaccharide employed as a starting material showed an inhibition ratio of 33 percent and complete regression of the sarcoma could not be observed in any of the eight mice tested for this purpose.

EXAMPLE 12

2 g Extracellular polysaccharide recovered from a culture broth of Gloeophyllum odoratum (FIRM P-1544) was reacted with ethylene chlorohydrin as in Example 11 to produce 2.5 g of a water-soluble, white powder. When tested according to the method of Example 7, the powder showed an inhibition ratio of 92 percent and complete regression of tumors in seven out of 10 tested mice. The starting material showed an inhibition ratio of 22 percent, but complete tumor regression was not found in any of the 10 tested mice.

The 1-mercapto-2-chloro-alkanes react with $\beta$-(1 → 3) glucans substantially as the corresponding alkylene chlorohydrins to produce water-soluble mercaptoalkyl glucans having inhibiting effects on Sarcoma 180 in mice comparable to those of the reaction products with alkylene sulfides, and thus somewhat inferior to the preferred oxygen analogs.

The bromine and iodine analogs of the 1-hydroxy and 1-mercapto-2-chloro-alkanes react with glucans in the same manner, but are less readily available and thus economically undesirable in the absence of compensating advantages.

The hydroxypentyl and mercaptopentyl derivatives of $\beta$-(1 → 3) glucans can be prepared as the lower homologs in a manner obvious from the preceding Examples, but are unattractive because of their weak antitumor effects.

The microorganisms identified in this application by accession numbers of recognized depository agencies are being offered for distribution in the current catalogs of these agencies, FERM P indicating the Fermentation Research Institute of the Agency of Industrial Science and Technology in the Ministry of Industrial Trade and Industry, Japan, and NRRL indicating the Northern Regional Research Laboratory of the U.S. Department of Agriculture.

What is claimed is:

1. A water-soluble hydroxyalkyl glucan or mercaptoalkyl glucan having a glucan moiety essentially consisting of glucose units connected by $\beta$-(1 → 3) bonds and 0.02 to 1.2 hydroxyalkyl or mercaptoalkyl moieties per glucose unit, said hydroxyalkyl or mercaptoalkyl having 2 to 4 carbon atoms, said compound having a molecular weight of more than 10,000.

2. A compound as set forth in claim 1 having 0.08 to 1.0 hydroxyalkyl or mercaptoalkyl moieties per glucose unit.

3. A compound as set forth in claim 1, wherein said glucan moiety is of $\beta$-pachyman, pachymaran, lentinan, schizophyllan, laminarin, or screloglucan.

4. A compound as set forth in claim 1, wherein said glucan moiety is derived from the fruit body, mycelium, or filtered culture broth of a basidiomycete.

5. A compound as set forth in claim 1 which is a hydroxyalkylglucan.

6. A compound as set forth in claim 1 which is a mercaptoalkylglucan.

7. A compound as set forth in claim 1, wherein said glucan moiety is of pachyman or pachymaran.

* * * * *